(12) United States Patent
Lower et al.

(10) Patent No.: US 9,435,915 B1
(45) Date of Patent: Sep. 6, 2016

(54) ANTIGLARE TREATMENT FOR GLASS

(71) Applicants: Nathan P. Lower, North Liberty, IA (US); Paul R. Nemeth, Springville, IA (US); Ross K. Wilcoxon, Cedar Rapids, IA (US)

(72) Inventors: Nathan P. Lower, North Liberty, IA (US); Paul R. Nemeth, Springville, IA (US); Ross K. Wilcoxon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 773 days.

(21) Appl. No.: 13/630,446

(22) Filed: Sep. 28, 2012

(51) Int. Cl.
*G02B 1/11* (2015.01)
*G02B 5/02* (2006.01)

(52) U.S. Cl.
CPC ............... *G02B 1/11* (2013.01); *G02B 5/021* (2013.01)

(58) Field of Classification Search
CPC ............... G02B 5/02–5/0294; G02F 2201/38
USPC ............... 359/577–590, 601–614, 599; 501/99–154
See application file for complete search history.

(56) References Cited

U.S. PATENT DOCUMENTS

| | | | |
|---|---|---|---|
| 3,508,974 A | 4/1970 | Bressler | |
| 3,635,751 A * | 1/1972 | Long et al. | 220/2.1 A |
| 3,654,528 A | 4/1972 | Barkan | |
| 3,723,790 A | 3/1973 | Dumbaugh et al. | |
| 3,812,404 A | 5/1974 | Barkan et al. | |
| 4,177,015 A | 12/1979 | Davidson | |
| 4,294,658 A | 10/1981 | Humphreys et al. | |
| 4,410,874 A | 10/1983 | Scapple et al. | |
| 4,505,644 A | 3/1985 | Meisner et al. | |
| 4,513,029 A | 4/1985 | Sakai | |
| 4,560,084 A | 12/1985 | Wolfson | |
| 4,572,924 A | 2/1986 | Wakely et al. | |
| 4,596,745 A * | 6/1986 | Chao | C03C 17/25 427/165 |
| 4,622,433 A | 11/1986 | Frampton | |
| 4,761,518 A | 8/1988 | Butt et al. | |
| 4,765,948 A | 8/1988 | DeLuca et al. | |
| 4,773,826 A | 9/1988 | Mole | |
| 4,802,531 A | 2/1989 | Nathenson et al. | |
| 4,882,212 A | 11/1989 | Singhdeo et al. | |
| 4,963,503 A | 10/1990 | Aoki et al. | |
| 5,041,342 A | 8/1991 | Umeda et al. | |
| 5,127,930 A | 7/1992 | Howorth | |
| 5,136,365 A | 8/1992 | Pennisi et al. | |
| 5,140,109 A | 8/1992 | Matsumoto et al. | |
| 5,184,211 A | 2/1993 | Fox | |
| 5,195,231 A | 3/1993 | Fanning et al. | |

(Continued)

FOREIGN PATENT DOCUMENTS

| | | |
|---|---|---|
| JP | 55-120083 | 9/1980 |
| JP | 57-027942 | 2/1982 |

(Continued)

OTHER PUBLICATIONS

Advisory Action for U.S. Appl. No. 11/508,782, mail date Aug. 31, 2009, 3 pages.

(Continued)

*Primary Examiner* — Bumsuk Won
*Assistant Examiner* — Jeffrey Madonna
(74) *Attorney, Agent, or Firm* — Donna P. Suchy; Daniel M. Barbieri

(57) ABSTRACT

Provided in one embodiment is an article, comprising: a glass material; and an antiglare material covering at least partially the glass material; wherein the antiglare material comprises at least one alkali silicate.

17 Claims, 7 Drawing Sheets

(56) References Cited

U.S. PATENT DOCUMENTS

| | | |
|---|---|---|
| 5,232,970 A | 8/1993 | Solc et al. |
| 5,244,726 A | 9/1993 | Laney et al. |
| 5,265,136 A | 11/1993 | Yamazaki et al. |
| 5,315,155 A | 5/1994 | O'Donnelly et al. |
| 5,502,889 A | 4/1996 | Casson et al. |
| 5,581,286 A | 12/1996 | Hayes et al. |
| 5,686,703 A | 11/1997 | Yamaguchi |
| 5,702,963 A | 12/1997 | Vu et al. |
| 5,863,605 A | 1/1999 | Bak-Boychuk et al. |
| 5,916,944 A | 6/1999 | Camilletti et al. |
| 5,958,794 A | 9/1999 | Bruxvoort et al. |
| 5,965,947 A | 10/1999 | Nam et al. |
| 5,991,351 A | 11/1999 | Woolley |
| 6,010,956 A | 1/2000 | Takiguchi et al. |
| 6,019,165 A | 2/2000 | Batchelder |
| 6,021,844 A | 2/2000 | Batchelder |
| 6,027,791 A | 2/2000 | Higashi et al. |
| 6,028,619 A | 2/2000 | Saita et al. |
| 6,039,896 A | 3/2000 | Miyamoto et al. |
| 6,048,656 A | 4/2000 | Akram et al. |
| 6,087,018 A | 7/2000 | Uchiyama |
| 6,110,656 A | 8/2000 | Eichorst et al. |
| 6,121,175 A | 9/2000 | Drescher et al. |
| 6,124,224 A | 9/2000 | Sridharan et al. |
| 6,159,910 A | 12/2000 | Shimizu et al. |
| 6,356,334 B1 | 3/2002 | Mathew et al. |
| 6,423,415 B1 | 7/2002 | Greene et al. |
| 6,451,283 B1 | 9/2002 | Kuznicki et al. |
| 6,452,090 B2 | 9/2002 | Takato et al. |
| 6,486,087 B1 | 11/2002 | Saling et al. |
| 6,496,359 B2 | 12/2002 | Clark et al. |
| 6,541,832 B2 | 4/2003 | Coyle |
| 6,586,087 B2 | 7/2003 | Young |
| 6,599,643 B2 | 7/2003 | Heimann et al. |
| 6,613,659 B2 | 9/2003 | Kikuchi et al. |
| 6,617,041 B2 | 9/2003 | Hahn et al. |
| 6,624,276 B2 | 9/2003 | Lamers et al. |
| 6,658,861 B1 | 12/2003 | Ghoshal et al. |
| 6,663,793 B2 | 12/2003 | Parkhill et al. |
| 6,664,567 B2 | 12/2003 | Kyoda et al. |
| 6,665,186 B1 | 12/2003 | Calmidi et al. |
| 6,708,501 B1 | 3/2004 | Ghoshal et al. |
| 6,743,529 B2 | 6/2004 | Saito et al. |
| 6,798,072 B2 | 9/2004 | Kajiwara et al. |
| 6,800,326 B1 | 10/2004 | Uchiyama |
| 6,800,330 B2 | 10/2004 | Hayashi et al. |
| 6,918,984 B2 | 7/2005 | Murray et al. |
| 6,929,861 B2 | 8/2005 | Lin |
| 6,960,878 B2 | 11/2005 | Sakano et al. |
| 6,986,859 B2 | 1/2006 | Mazany et al. |
| 7,045,905 B2 | 5/2006 | Nakashima |
| 7,078,263 B2 | 7/2006 | Dean |
| 7,114,251 B2 | 10/2006 | Mashino |
| 7,131,286 B2 | 11/2006 | Ghoshal et al. |
| 7,145,619 B2 | 12/2006 | Sawasaki et al. |
| 7,175,937 B2 | 2/2007 | Cho et al. |
| 7,176,564 B2 | 2/2007 | Kim |
| 7,202,598 B2 | 4/2007 | Juestel et al. |
| 7,265,977 B2 | 9/2007 | Martin et al. |
| 7,293,416 B2 | 11/2007 | Ghoshal |
| 7,296,417 B2 | 11/2007 | Ghoshal |
| 7,297,206 B2 | 11/2007 | Naruse et al. |
| 7,307,286 B2 | 12/2007 | Ito et al. |
| 7,327,039 B2 | 2/2008 | Charles et al. |
| 7,340,904 B2 | 3/2008 | Sauciuc et al. |
| 7,342,787 B1 | 3/2008 | Bhatia |
| 7,348,665 B2 | 3/2008 | Sauciuc et al. |
| 7,365,984 B2 | 4/2008 | Jeong |
| 7,391,060 B2 | 6/2008 | Oshio |
| 7,441,087 B2 | 10/2008 | Hakura et al. |
| 7,473,460 B2 | 1/2009 | Meguro et al. |
| 7,491,431 B2 | 2/2009 | Chiruvolu et al. |
| 7,497,961 B2 | 3/2009 | Keenan et al. |
| 7,651,556 B2 | 1/2010 | Komiyama et al. |
| 7,671,468 B2 | 3/2010 | Kanazawa et al. |
| 7,677,942 B2 | 3/2010 | Shin et al. |
| 7,692,259 B2 | 4/2010 | Suehiro |
| 7,737,356 B2 | 6/2010 | Goldstein |
| 7,767,502 B2 | 8/2010 | Kim et al. |
| 7,889,284 B1 | 2/2011 | Nemeth et al. |
| 7,910,403 B2 | 3/2011 | Hirano et al. |
| 7,915,527 B1 | 3/2011 | Lower et al. |
| 8,017,872 B2 | 9/2011 | Cripe et al. |
| 8,076,185 B1 | 12/2011 | Lower et al. |
| 8,084,855 B2 | 12/2011 | Lower et al. |
| 8,119,040 B2 | 2/2012 | Lower et al. |
| 8,166,645 B2 | 5/2012 | Wilcoxon et al. |
| 8,174,830 B2 | 5/2012 | Lower et al. |
| 8,184,974 B2 | 5/2012 | Cline |
| 8,419,965 B1 | 4/2013 | Nemeth et al. |
| 8,723,809 B1 | 5/2014 | Barnidge et al. |
| 2001/0015443 A1 | 8/2001 | Komoto |
| 2002/0054976 A1 | 5/2002 | Nakamura et al. |
| 2002/0076192 A1 | 6/2002 | Bartholomew et al. |
| 2002/0189894 A1 | 12/2002 | Davis et al. |
| 2003/0228424 A1 | 12/2003 | Dove et al. |
| 2004/0194667 A1 | 10/2004 | Reuscher |
| 2005/0099775 A1 | 5/2005 | Pokharna et al. |
| 2005/0116237 A1 | 6/2005 | Voutsas |
| 2005/0123684 A1 | 6/2005 | Makowski et al. |
| 2006/0045755 A1 | 3/2006 | McDonald et al. |
| 2006/0068218 A1 | 3/2006 | Hooghan et al. |
| 2006/0113066 A1 | 6/2006 | Mongia et al. |
| 2006/0135342 A1 | 6/2006 | Anderson et al. |
| 2006/0181774 A1* | 8/2006 | Ojima .................. G02B 1/111 359/586 |
| 2006/0250731 A1 | 11/2006 | Parkhurst et al. |
| 2006/0283546 A1 | 12/2006 | Tremel et al. |
| 2007/0102833 A1 | 5/2007 | Hack et al. |
| 2007/0108586 A1 | 5/2007 | Uematsu et al. |
| 2008/0006204 A1 | 1/2008 | Rusinko et al. |
| 2008/0063875 A1 | 3/2008 | Robinson et al. |
| 2009/0068474 A1* | 3/2009 | Lower .................. C09D 1/02 428/433 |
| 2009/0197048 A1* | 8/2009 | Amin .................... C03C 3/085 428/142 |
| 2009/0244703 A1* | 10/2009 | Asakura ............... B29C 41/28 359/485.01 |
| 2012/0300304 A1* | 11/2012 | Gollier ................. C03C 15/00 359/599 |
| 2013/0127202 A1* | 5/2013 | Hart .................... B32B 17/10036 296/146.1 |

FOREIGN PATENT DOCUMENTS

| | | |
|---|---|---|
| JP | 60-013875 | 1/1985 |
| JP | 02-064071 | 3/1990 |
| JP | 11-095426 | 4/1999 |
| JP | 2003-332505 | 11/2003 |
| JP | 2006-045420 | 2/2006 |
| WO | WO-2006/095677 A1 | 9/2006 |

OTHER PUBLICATIONS

Advisory Action for U.S. Appl. No. 11/959,225, mail date Jul. 5, 2011, 3 pages.

Click et al., Schott Low Temperature Bonding for Precision Optics, http://optics.nasa.gov/tech_days/tech_days_2004/docs/18%20Aug%202004/23%20Schott%20Low%20Temperature%20Bonding.pdf, 20 pages.

Golubev et al., Modeling of Acid-Base Properties of Binary Alkali-Silicate Melts, Rev. Adv. Mater. Sci. 6, (2004), pp. 33-40, website: http://www.ipme.ru/e-journals/RAMS/no_1604/golubev/golubev.pdf.

International Search Report and Written Opinion for Application No. PCT/US2009/031699, mail date Aug. 18, 2009, 16 pages.

International Search Report and Written Opinion for Application No. PCT/US2009/036355, mail date Jun. 30, 2009, 11 pages.

International Search Report and Written Opinion for International Application No. PCT/US2008/074224, mail date Jan. 30, 2009, 9 pages.

(56) References Cited

OTHER PUBLICATIONS

International Search Report and Written Opinion for International Application No. PCT/US2008/075591, mail date Apr. 8, 2009, 7 pages.
Kennedy, Strength and Fracture Toughness of Binary Alkali Silicate Glasses (Abstract only), http://www.oai.dtic.mil/oai/oai?verb=getRecord&metadataPrefix=html&identifier=ADA016820, Feb. 14, 1974, 1 page.
Lewis et al., Direct Writing in Three Dimension, Materialstoday, Jul./Aug. 2004, 8 pages.
Mysen et al., Properties and Structure (Developments in Geochemistry), Silicate Glasses and Melts, vol. 10, http://www.amazon.com/Silicate-Glasses-Melts-Developments-Geochemistry/dp/0444520112, 4 pages.
Nascimento et al., Universal Curve of Ionic Conductivities in Binary Alkali Silicate Glasses, http://www.springerlink.com/content/p7535075x1872016/, Journal of Materials Science (2005), 3 pages.
Notice of Allowance for U.S. Appl. No. 11/508,782, mail date May 31, 2011, 9 pages.
Notice of Allowance for U.S. Appl. No. 11/508,782, mail date Sep. 20, 2011, 7 pages.
Notice of Allowance for U.S. Appl. No. 11/732,981, mail date Dec. 29, 2011, 7 pages.
Notice of Allowance for U.S. Appl. No. 11/732,981, mail date Jul. 26, 2011, 7 pages.
Notice of Allowance for U.S. Appl. No. 11/784,158, mail date Nov. 29, 2010, 4 pages.
Notice of Allowance for U.S. Appl. No. 11/784,932, mail date Aug. 23, 2011, 8 pages.
Notice of Allowance for U.S. Appl. No. 11/784,932, mail date May 12, 2011, 6 pages.
Notice of Allowance for U.S. Appl. No. 12/116,126, mail date Jan. 5, 2012, 10 pages.
Notice of Allowance for U.S. Appl. No. 12/284,670, mail date May 11, 2011, 7 pages.
Notice of Allowance for U.S. Appl. No. 12/286,207, mail date Jun. 27, 2011, 12 pages.
Notice of Allowance for U.S. Appl. No. 12/286,207, mail date Oct. 6, 2011, 8 pages.
Notice of Allowance for U.S. Appl. No. 12/485,744, mail date Dec. 21, 2012, 7 pages.
Notice of Allowance for U.S. Appl. No. 12/493,022, mail date Sep. 20, 2012, 5 pages.
Office Action for U.S. Appl. No. 11/508,782, mail date Dec. 24, 2008, 9 pages.
Office Action for U.S. Appl. No. 11/508,782, mail date Feb. 24, 2010, 12 pages.
Office Action for U.S. Appl. No. 11/508,782, mail date Jan. 19, 2011, 9 pages.
Office Action for U.S. Appl. No. 11/508,782, mail date Jun. 16, 2009, 13 pages.
Office Action for U.S. Appl. No. 11/732,981, mail date Mar. 16, 2011, 7 pages.
Office Action for U.S. Appl. No. 11/732,981, mail date Oct. 6, 2010, 9 pages.
Office Action for U.S. Appl. No. 11/732,982, mail date Feb. 2, 2011, 15 pages.
Office Action for U.S. Appl. No. 11/732,982, mail date Jun. 21, 2011, 14 pages.
Office Action for U.S. Appl. No. 11/732,982, mail date Sep. 14, 2011, 13 pages.
Office Action for U.S. Appl. No. 11/784,158, dated Oct. 8, 2009, 7 pages.
Office Action for U.S. Appl. No. 11/784,158, mail date Apr. 21, 2009, 10 pages.
Office Action for U.S. Appl. No. 11/784,158, mail date Jun. 17, 2010, 6 pages.
Office Action for U.S. Appl. No. 11/784,158, mail date Mar. 26, 2010, 7 pages.
Office Action for U.S. Appl. No. 11/784,932, dated Apr. 3, 2009, 9 pages.
Office Action for U.S. Appl. No. 11/959,225, mail date Nov. 18, 2011, 17 pages.
Office Action for U.S. Appl. No. 11/959,225, mail date Oct. 27, 2010, 11 pages.
Office Action for U.S. Appl. No. 12/116,126, mail date Apr. 22, 2010, 7 pages.
Office Action for U.S. Appl. No. 12/116,126, mail date Feb. 25, 2011, 9 pages.
Office Action for U.S. Appl. No. 12/116,126, mail date May 10, 2011, 8 pages.
Office Action for U.S. Appl. No. 12/116,126, mail date Nov. 20, 2009, 7 pages.
Office Action for U.S. Appl. No. 12/116,126, mail date Oct. 25, 2010, 8 pages.
Office Action for U.S. Appl. No. 12/116,126, mail date Sep. 12, 2011, 11 pages.
Office Action for U.S. Appl. No. 12/240,775, mail date May 26, 2011, 9 pages.
Office Action for U.S. Appl. No. 12/283,563, mail date Oct. 11, 2011, 13 pages.
Office Action for U.S. Appl. No. 12/284,670, mail date Feb. 17, 2011, 12 pages.
Office Action for U.S. Appl. No. 12/284,670, mail date Sep. 28, 2010, 10 pages.
Office Action for U.S. Appl. No. 12/286,207, mail date Dec. 27, 2010, 14 pages.
Office Action for U.S. Appl. No. 12/485,744, mail date Mar. 15, 2012, 8 pages.
Office Action for U.S. Appl. No. 12/485,744, mail date Oct. 10, 2012, 11 pages.
Office Action for U.S. Appl. No. 12/493,022, mail date May 30, 2012, 13 pages.
Office Action for U.S. Appl. No. 12/611,016, mail date May 4, 2012, 18 pages.
Optomec® Systems M3D® Breakthrough Technology for Printable Electronics, pp. 1-2.
Pedone et al., Insight into Elastic Properties of Binary Alkali Silicate Glasses; Prediction and Interpretation through Atomistic Simulation Techniques, http://pubs.acs.org/doi/abs/10.1021/cm062619r, Chemistry of Materials, 2007, 2 pages.
PQ Corporation, Bonding and Coating Applications of PQ® Soluble Silicates, Bulletin 12-31, (2003) 7 pages.
PQ Corporation, PQ® Soluble Silicates in Refractory and Chemical-Resistant Cements, Bulletin 24-1, (2003), 6 pages.
Restriction Requirement for U.S. Appl. No. 11/959,225, mail date Jul. 22, 2009, 10 pages.
Restriction Requirement for U.S. Appl. No. 12/240,775, mail date Jan. 12, 2012, 5 pages.
Restriction Requirement for U.S. Appl. No. 12/485,744, mail date Nov. 3, 2011, 7 pages.
Restriction Requirement for U.S. Appl. No. 12/493,022, mail date Feb. 22, 2012, 6 pages.
Shermer, Thermal Expansion of Binary Alkali Silicate Glasses, http://nvl.nist.gov/pub/nistpubs/jres/057/2/V57.N02.A05, Journal of Research of the National Bureau of Standards, Aug. 1956, Research Paper No. 2698, 5 pages.
The Electrochemical Soecity's Cleaing Technology in Semiconductor Device Manufacturing VI, 2000, vol. 99-36, 3 pages.
The Mixed-Alkali Effect for the Viscosity of Glasses, http://glassproperties.com/viscosity/mixed-alkali-effect-viscosity/, 7 pages.
The Springer Handbook of Nanotechnology, 2nd Ed., Copyright 2004 & 2007, 3 pages.
The Structure of Glasses. Alkali silicate glasses, printed on Dec. 3, 2010 from website: http://www.ptc.tugraz.at/specmag/struct/ss.htm, 1 page.
Thresh, The Action of Natural Waters on Lead, The Analyst, Proceedings of the Society of Public Analysts and Other Analytical Chemists, Nov. 1922, 11 pages.

* cited by examiner (a)

ANTIGLARE TREATMENT FOR GLASS

BACKGROUND

High strength glasses are commonly used in electronic devices, particularly in displays. One popular type of high strength glass, known as Gorilla® glass by Corning Incorporated, is used in over 400 million commercial devices throughout the world. Antiglare ("AG") treatments are generally needed for these high strength glasses before they are employed. Diffusive polymer films or chemical etching are often used to provide the desired antiglare properties. However, the polymer films are often expensive, and chemical etching can be selective to glass composition and thus lack the flexibility to be implemented with different types of glasses.

SUMMARY

In view of the foregoing, the present Inventors have recognized and appreciated the advantages of an antiglare treatment that is inexpensive and highly durable according to one exemplary embodiment. A display system including an article that has undergone the antiglare treatment described herein may be employed in an electronic display suitable for military or civil (e.g., commercial) applications as well as other applications including but not limited to entertainment applications, computing applications, and communication applications.

Accordingly, one embodiment provides an article, comprising: a glass material; and an antiglare material covering at least partially the glass material. The antiglare material comprises at least one alkali silicate.

Another embodiment provides a method of making a display assembly. The method comprises applying an antiglare material onto at least one surface of a glass material disposed over a display to cover at least partially the at least one surface. The antiglare material comprises at least one alkali silicate glass.

Another embodiment provides a display assembly The assembly comprises a display, and a coating material disposed over the display. The coating material comprises a glass material covering at least partially the display, and an antiglare material covering at least partially the glass material. The antiglare material comprises at least one alkali silicate glass.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following are more detailed descriptions of various concepts related to, and embodiments of, inventive inexpensive antiglare glass treatments that can be applied to a wide range of glass types and, at the same time, strengthen the glass beyond chemical strengthening capabilities. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Antiglare Treated Glass Article

Figure 1:
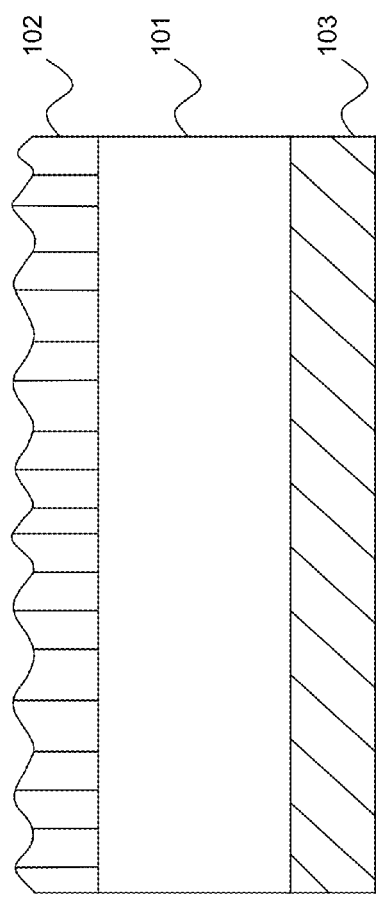
FIG. 1 provides a schematic side view drawing of glass material with an antiglare coating material used with an article such as a display according to one illustrative embodiment.

The antiglare treatment described herein may be employed and applied to a variety of glass materials. A treated glass material may be a part of an article, which, as described later, may be a (part of) a display assembly (e.g., a liquid crystal display (LCD) assembly) or other optical assembly. One embodiment described herein provides an article, the article comprising a glass material and an antiglare material covering at least partially the glass material. The antiglare material may cover only a portion of the glass material or an entire surface of the glass material. The surface herein may refer to a top surface, side surface, a bottom surface, or all of the above. FIG. 1 provides an illustrative schematic showing an article comprising an antiglare treated glass material. The antiglare material 102 may be of any material that may reduce glaring when applied onto the glass material 101. The glass material may be further disposed over or above a display 103. In one embodiment, the antiglare material comprises at least one alkali silicate. In another embodiment, the antiglare material consists essentially of the at least one alkali silicate. In another embodiment, the antiglare material consists of the at least one alkali silicate.

The glass material to be treated by the antiglare treatment (with the antiglare material) described herein may be any type of glass material. For example, the glass material may be a high strength glass that is suitable for a display, such as an electronic display. In one embodiment, the glass material may comprise soda lime, aluminosilicate, or a combination thereof. The aluminosilicate may be any aluminosilicate e, such as an alkali aluminosilicate. An example of alkali aluminosilicate is the Gorilla glass manufactured by Corning Incorporated. Other types of glasses may be used as well.

The glass material may have any geometry, referring to the shape and size thereof. Depending on the application, the glass material may, for example, be a sheet or film. The thickness of the glass is not limited and may vary based on the application. For example, the glass material may have a thickness of between about 0.1 mm and about 100 mm—e.g., between about 0.5 mm and about 80 mm, between about 1 mm and about 60 mm, between about 5 mm and about 40 mm, between about 10 mm and about 20 mm, etc.

The antiglare material described herein may comprise at least one alkali silicate, such as an alkali silicate glass ("ASG"). The alkali element of the alkali silicate may refer to an alkali metal element or an alkali earth metal element. The term "element" herein refers to the atomic element found on a Periodic Table. Accordingly, the alkali silicate comprises an alkali metal element, an alkali earth metal element, or a combination thereof. In one embodiment, the alkali silicate refers to an alkali metal silicate. For example, in this embodiment, the alkali silicate may refer to lithium silicate, sodium silicate, potassium silicate, rubidium silicate, cesium silicate, francium silicate, or combinations thereof.

The antiglare material may have any geometry, including size and shape. The geometry of the antiglare material may be the same as that of the underlying glass material. Alternatively, the antiglare material may have a different geometry than the underlying glass material. The antiglare material may have the same thickness as the underlying glass material. Alternatively, the antiglare material may have a different thickness than the underlying glass material. For example, the antiglare material may be thinner or thicker than the glass material. In one embodiment, the antiglare material is thinner than the glass material. In such an embodiment, the antiglare material may resemble a thin film or even a coat of paint disposed over the underlying (much thicker) glass material.

The antiglare material may be relatively smooth or may have a certain level of roughness (as shown in FIG. 1, which is not drawn to scale). One benefit of the antiglare treatment described herein, as will be further described below, is that the roughness of the antiglare material may be controlled. In one embodiment, the roughness of the antiglare material is at about the same level as that otherwise would have been obtained from a pre-existing antiglare treatment (e.g., chemical etching). For example, for an antiglare film of less than about 1 micron, the average roughness of the antiglare material may be between 50 nm and about 200 nm—e.g., between about 100 nm and about 150 nm, between about 120 nm and about 140 nm. In one embodiment, the average roughness may be about 130 nm. The peak-to-valley (maximum to minimum) for the roughness may be, for example, 0.5 microns for an antiglare material of between 0.35 microns and about 0.75 microns. Other values of roughness are also possible, depending on the treatment conditions and the materials involved.

Figure 2:
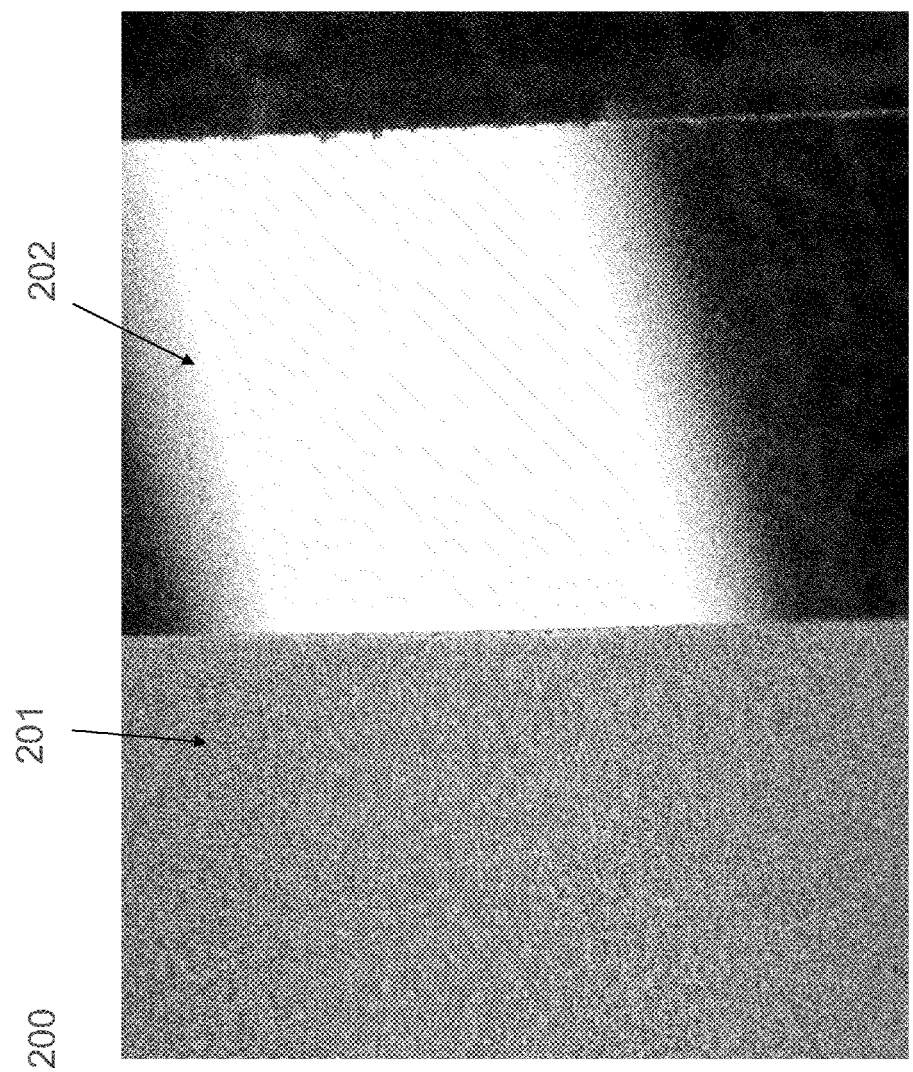
FIG. 2 is an optical image of a glass material partially coated with an alkali silicate containing antiglare coating material on one portion according to one illustrative embodiment.
Figure 3:
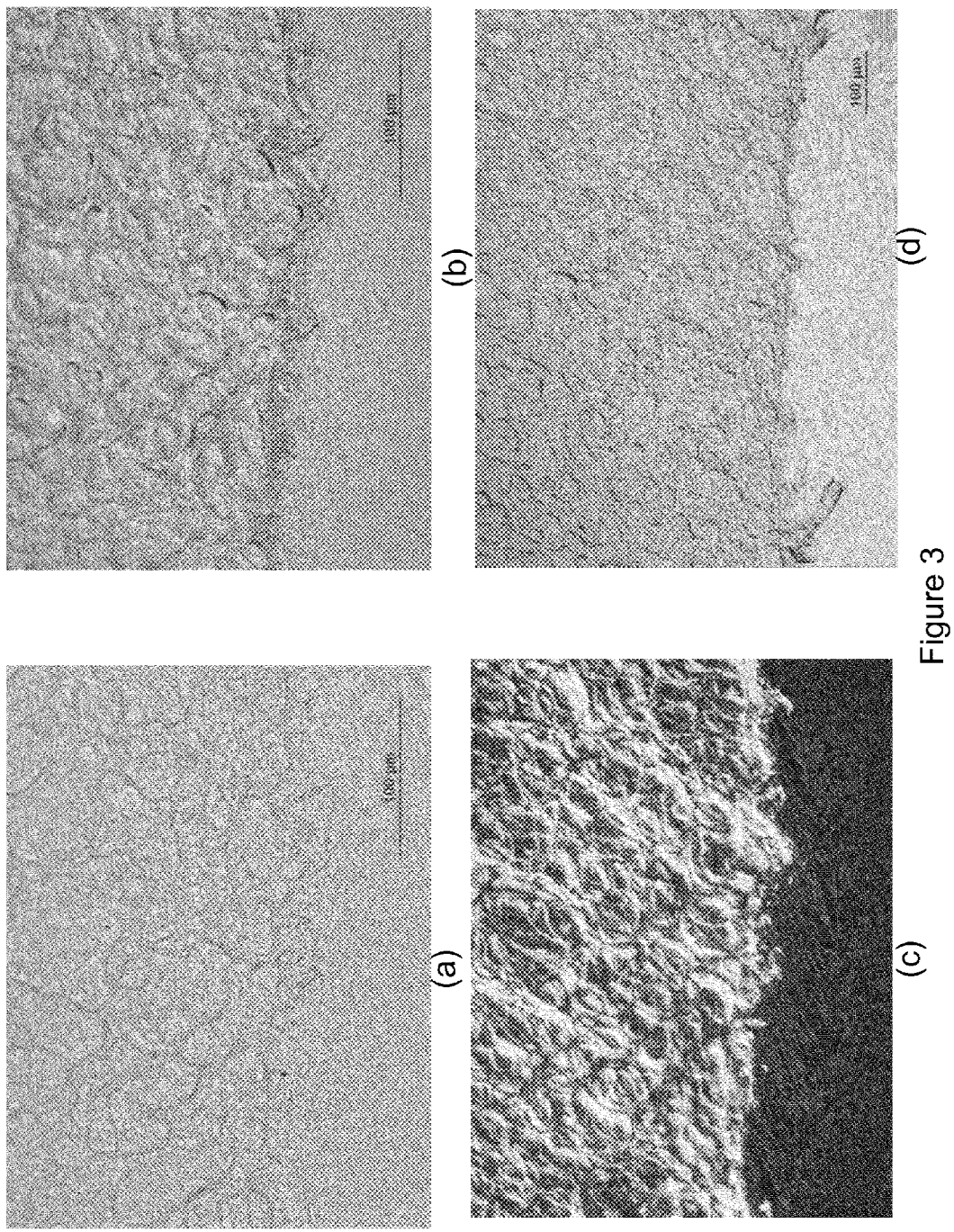
FIGS. 3(a)-3(g) provide a series of optical images showing the textured surface of an antiglare material on a glass material under different microscope settings according to one illustrative embodiment.
Figure 3:
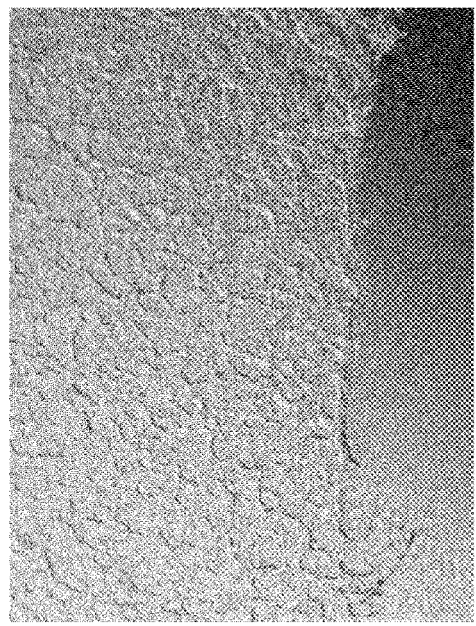
Figure 3:
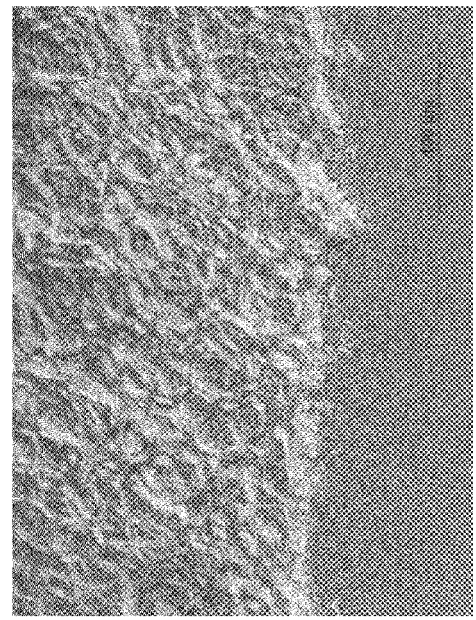
Figure 3:
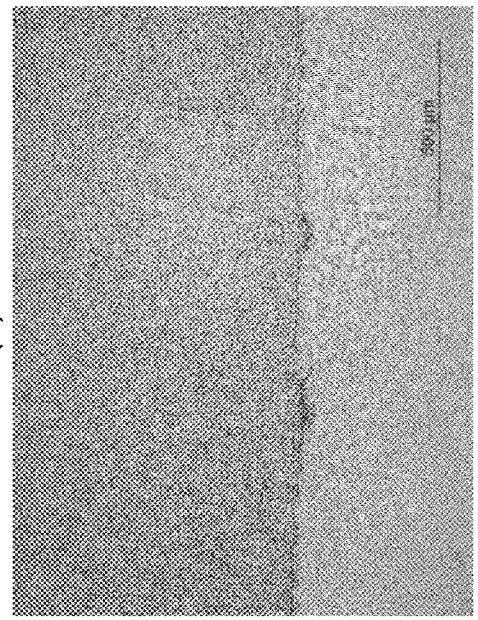

Although not always the case, the antiglare material in some embodiments described herein may have a textured surface. FIGS. 2 and 3(a)-(g) demonstrate the textured surfaces that are observed in at least some embodiments described herein. FIG. 2, shown with reflected light, demonstrates an antiglare treated glass material 200, which comprises the antiglare material 201 and the underlying glass material 202, shown as an untreated (or uncoated portion). The antiglare material 201 may contain, or may be, at least one ASG material. As shown in FIG. 2, at least in one embodiment, while the ASG-containing antiglare material may be optically transparent, the surface of the ASG material, due at least in part to the processing conditions, has a textured surface. The optical transparency and the textured surface of the antiglare material are demonstrated in FIG. 3(a). FIGS. 3(a)-3(g) are micrograph images of one illustrative sample taken at different imaging conditions. The antiglare film is optically transparent and at the same time shows certain texture on the surface.

As mentioned above, to provide an antiglare effect, an antiglare material using ASG may avoid the drawback of using a polymer film, as in the pre-existing method; the polymer film is much more expensive than an ASG material. Thus, in the antiglare treatment described in at least one embodiment herein, no polymer is needed for the antiglare material. In one embodiment, the antiglare material is at least substantially free of a polymer material. In another embodiment, the antiglare material is entirely free of a polymer material.

Applications

The antiglare treated glass described herein may be employed in a variety of applications. One such application is a display, such as a display in an electronic device. One embodiment provides a display assembly, comprising: a display; and a coating material disposed over the display, the coating material comprising: a glass material covering at least partially the display; and an antiglare material covering at least partially the glass material. The glass material and the antiglare material may be any of those described above. In one embodiment, the antiglare material may comprise at least one alkali silicate glass. In another embodiment, the antiglare material may consist essentially of at least one alkali silicate glass. In another embodiment, the antiglare material may consist of at least one alkali silicate glass.

The electronic device may be any types of commercially available electronic devices. For example, the display may be a part of a cell phone, tablet computer, desktop, laptop, TV, computer monitor, or any other electronic device that has a display component. The display described herein may also be used in military, as well as civil (e.g., commercial) applications. For example, the display may be a part of a control console of equipment or machinery, such as aircraft, automotive vehicles, marine applications (boats, submarines, etc), and the like.

Method of Making a Display Assembly

Figure 4:
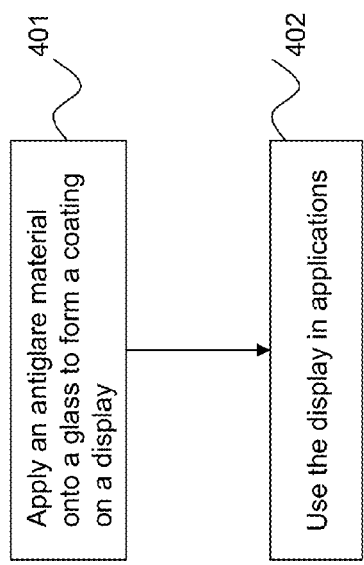
FIG. 4 provides a schematic flowchart showing the process of applying an antiglare treatment to a glass according to one illustrative embodiment.

The antiglare treated glass material described herein may be made by a variety of processes, depending on the application. The treated glass material may then be implemented in a display assembly. FIG. 4 provides a flowchart showing at least some steps that may be involved in an antiglare treatment process in one illustrative embodiment. As shown in FIG. 4, this embodiment provides a method of making a display assembly, the method first comprising a step 401 of forming a coating material by applying an antiglare material onto at least one surface of a glass material disposed over a display to cover at least partially at least one surface. The antiglare material and the glass material may be any of those aforedescribed.

The antiglare material being applied to the glass material may be a suspension of the alkali silicate(s) in a liquid solution. The solution may be any solvent, such as water. The antiglare material may be applied to the glass material by various techniques. For example, the application may involve spraying a suspension of the antiglare material onto at least one surface of the glass material. The surface, as described above, may refer to the top, bottom, side surfaces, or all of them.

In one embodiment, an ASG-containing antiglare material is provided in the form of a liquid solution, which solution is then cured to remove the liquid, which leaves a solid, moisture-impermeable material. In one embodiment, the alkali silicate glass material advantageously exhibits dielectric material properties and is relatively resistant to moisture (i.e., the material generally will not absorb moisture), which makes such materials suitable for use in environments in which humidity absorption can degrade the mechanical properties of the substrate and/or modify its electrical characteristics.

In one embodiment, an alkali silicate material is provided in solution with a liquid such as deionized water, after which the water is removed (e.g., by drying in air naturally and/or curing) from the solution. The solution may include one or more alkali silicates, such as lithium, sodium, potassium, rubidium, cesium, or francium silicate materials. The solution may include a single type of alkali silicate (e.g., lithium silicate) or more than one type (e.g., a 1:1 molar ratio of lithium silicate and potassium silicate or a 1:1 molar ratio of lithium silicate and sodium silicate). Different ratios and/or different silicates may be used.

Liquid alkali silicate solutions are commercially available from companies such as PQ Corporation of Malvern, Pa. in a wide variety of $SiO_2$ to $M_2O$ weight ratios (this ratio may be referred to as the "R value" for the solution). For example, solutions having R values of between 1.00 and 3.5 or greater than 3.5 may be obtained or created by dissolving additional silica into aqueous alkali silicate solutions. These solutions may be used as-is or may be further modified (e.g., by adding deionized water to the solution, by adding particles to modify its thermal expansion coefficient or other characteristics, etc.). The particular materials utilized may vary depending on the desired application, material properties, and other factors according to various exemplary embodiments.

Highly siliceous liquid alkali silicate solutions tend to air dry rapidly, are the most refractory (high melting temperature), and are the most resistant to acids and corrosion. These silica rich liquid solutions tend to contain more water than alkaline rich solutions (per similar viscosity), and thus undergo greater shrinkage while curing. Low silicate ratio, alkaline rich, solutions tend to have greater elasticity, lower brittleness, and less shrinkage but may exhibit poor corrosion resistance. These low ratio coatings also dry more slowly because their alkali content creates a greater affinity for water. Many chemically resistant cements and mortars are produced using high ratio (e.g., approximately 3.25) alkali silicate solutions. Alternatively, high alkali ratio silicate solutions may be doped with filler materials to produce a composite that has excellent moisture and corrosion resistance as compared to the undoped material.

In order for the alkali silicate materials to become moisture impermeable and relatively insoluble, the water needs to be at least nearly completely removed from the solution. The alkali silicate solutions may be cured at relatively low temperatures (e.g., less than or equal to 160° C., and between approximately 95 and 100° C. according to a particular exemplary embodiment) to remove the water and solidify the material, thereby reducing residual stresses and processing costs. According to other exemplary embodiments, curing temperatures of greater than 160° C. may be utilized. According to still other exemplary embodiments, curing temperatures of less than 100° C. may be used as desired (e.g., air drying may remove a sufficient degree of moisture from the material for a particular application, particularly in environments where there is not substantial ambient humidity). For example, according to one exemplary embodiments, an alkali silicate solution may be cured at a temperature of between approximately 120 and 160° C. for a period of between about 120 and about 240 minutes to remove the water therefrom. Depending on the temperature and material, different lengths of curing time may be employed. For example, the cure time may be between about 30 minutes and about 480 minutes—e.g., between about 60 minutes and about 360 minutes, between about 120 minutes and about 240 minutes, between 180 minutes and about 200 minutes. Although it should be understood that different curing times and temperatures may be used according to various other exemplary embodiments. It is intended that once cured, the material will advantageously be capable of withstanding high temperatures (e.g., up to a glass transition temperature of approximately 700° C.).

In one embodiment, one benefit of using the antiglare material described herein is that the material immediately after application (to the glass material) is dry to the touch of an observer. The application step may further comprise curing the applied antiglare material, such as by the curing process described above. In some embodiments, the application step may further comprise controlling the roughness of the applied antiglare material, for example, by changing the application (e.g., spraying) condition. In one embodiment, the antiglare treated glass material (e.g., by coated with an antiglare material) described herein may be further subjected to additional process(es), such as strengthening. The strengthening may be any types of strengthening, such as mechanical strengthening and/or chemical strengthening. An example of a chemical strengthening process may be an ion exchange chemical process. In one embodiment, the strengthening may be optional and may further increase the strength of the high-strength antiglare treated glass even further.

As shown in FIG. 4, after the coating material is formed, the method may optionally further comprise a step 402 of employing the coated display for any suitable applications.

One surprising advantage that the present Inventors have discovered with respect to the antiglare treatment described herein is that the antiglare material described herein may not only provide an antiglare effect but also strengthens the treated glass material. The antiglare material described herein allow the treated glass material to be strengthened to at least about the same level (or greater) as that which would have been obtained using conventional separate strengthening techniques (e.g., chemical ion exchange process). The strengthening may refer to several material mechanical properties. For example, the strengthening may refer to increased impact strength (load required to break) and deflection distance measured during an impact test. Because of the various geometries and sizes that might be possible (and thus a wide range of values might be possible), one metric to describe the enhancement of the treated glass material (or coated with an antiglare material) provided herein is to describe the strength of the treated glass material in comparison to the glass before treatment. In some embodiments, the treatment glass material has an impact strength at least about 5% higher than that of the glass material itself (i.e., without treatment)—at least about 5%, 10%, 20%, 30%, 40%, 50%, 60%, 70%, 80%, 90%, 100% or more higher.

Figure 5:
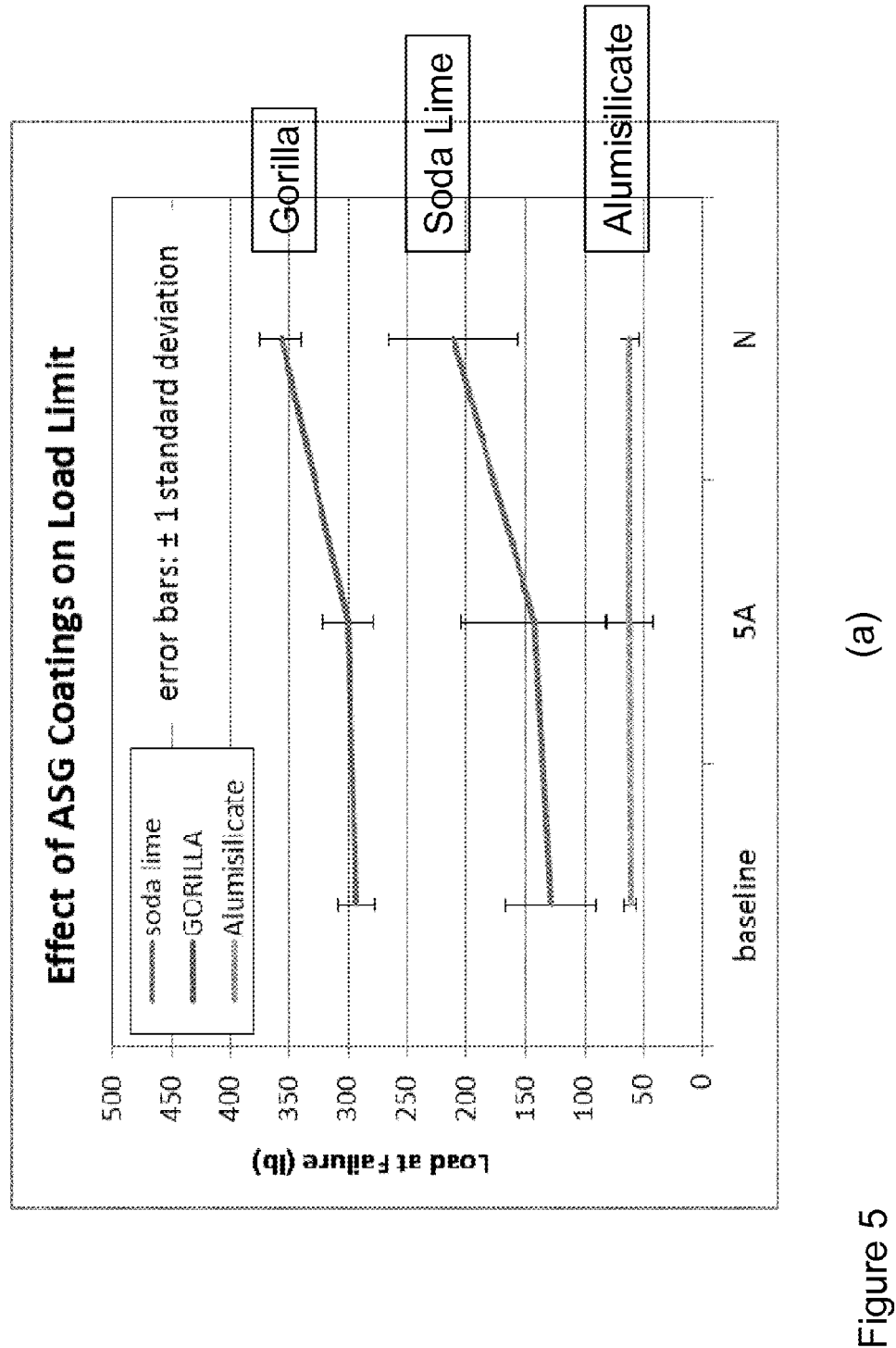
FIGS. 5(a)-5(b) are graphical diagrams showing the results of a mechanical test with respect to impact strength and deflection, respectively, to show the effect of the antiglare treatment provided according to one illustrative embodiment.
Figure 5:
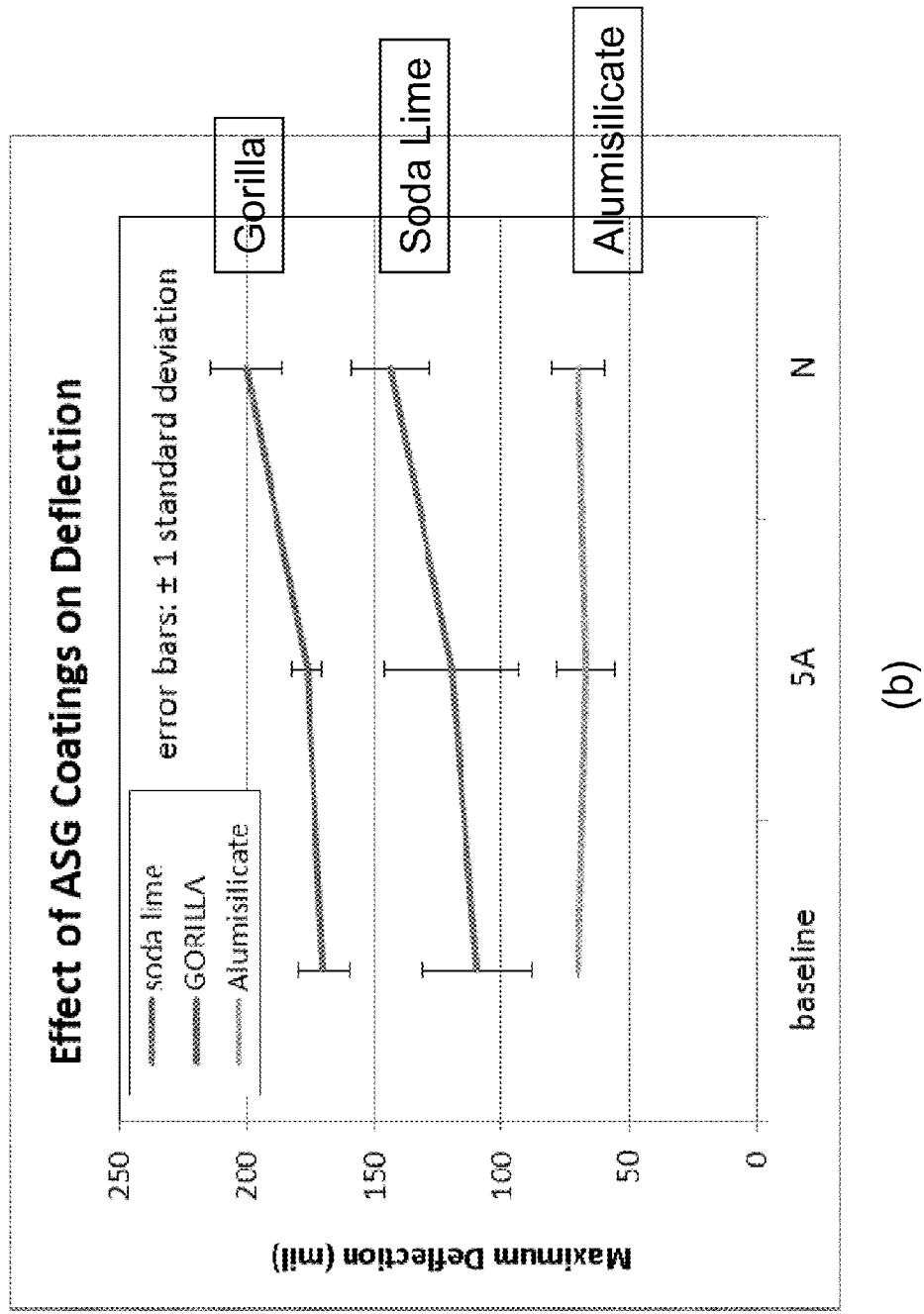

FIG. 5 provide measurement data obtained from an impact test for a series of treated and untreated (i.e., negative controls) samples. The glass samples investigated were Gorilla glass, soda lime, and aluminosilicate. The antiglare material N contained sodium silicate and the antiglare material 5A contained lithium silicate and potassium silicate. The results are shown in FIG. 5(a)-5(b).

As shown in FIG. 5(a), in the case of a soda lime glass, the glass treated with 5A showed an about 8% increase in maximum load at failure while that treated with N showed an about 50% increase. In the case of a Gorilla glass, the glass treated with 5A showed an about 2% increase in maximum load at failure while that treated with N showed an about 20% increase. In the case of an aluminosilicate glass, the glass treated with 5A showed an about 1% increase in maximum load at failure while that treated with N showed an about 1% increase. Similar improvement as a result of the antiglare treatment may be observed in the maximum deflection, as shown in FIG. 5(b).

CONCLUSION

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters including dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. An article, comprising:
    a glass material; and
    an antiglare material covering at least partially the glass material;
    wherein the antiglare material comprises at least one alkali silicate,
    wherein the glass material is soda lime glass,
    wherein the antiglare material is silica rich having a high silicate ratio of $SiO_2$ to other chemicals in the antiglare material of at least about 3.25,
    wherein the article has an impact strength at least 20% higher than that of the glass material.

2. The article of claim 1, wherein the alkali silicate comprises an alkali metal element, an alkali earth metal element, or a combination thereof.

3. The article of claim 1, wherein the alkali silicate comprises lithium silicate, sodium silicate, potassium silicate, rubidium silicate, cesium silicate, francium silicate, or combinations thereof.

4. The article of claim 1, wherein a surface of the antiglare material is textured.

5. The article of claim 1, wherein the antiglare material is optically transparent.

6. The article of claim 1, wherein the article has an impact strength at least 50% higher than that of the glass material.

7. The article of claim 1, wherein the article is a part of an electronic display assembly.

8. A method of making a display assembly, comprising:
    applying an antiglare material onto at least one surface of a glass material disposed over a display to cover at least partially the at least one surface and form an article;
    wherein the antiglare material comprises at least one alkali silicate glass, wherein the glass material is soda lime glass,
    wherein the antiglare material is silica rich having a high silicate ratio of $SiO_2$ to other chemicals in the antiglare material of at least about 3.25,
    wherein the article has an impact strength at least 20% higher than that of the glass material.

9. The method of claim 8, wherein the antiglare material is in the form of a suspension of the at least one alkali silicate in a liquid solution.

10. The method of claim 9, further comprising curing the liquid solution to remove the liquid.

11. The method of claim 8, wherein the applying comprises at least spraying the antiglare material onto the at least one surface of a glass material.

12. The method of claim 8, further comprising subjecting the glass material to a process of chemical strengthening.

13. The method of claim 8, wherein the antiglare material immediately after the application is dry to the touch.

14. The method of claim 8, wherein the applying comprises controlling a roughness of the antiglare material.

15. A display assembly, comprising:
    a display; and
    a coating material disposed over the display, the coating material comprising:
        a glass material covering at least partially the display; and
        an antiglare material covering at least partially the glass material;
    wherein the antiglare material comprises at least one alkali silicate glass,
    wherein the glass material is soda lime glass,
    wherein the antiglare material is silica rich having a high silicate ratio of $SiO_2$ to other chemicals in the antiglare material of at least about 3.25,
    wherein the coating material has an impact strength at least 20% higher than that of the glass material.

16. The display assembly of claim 15, wherein the display is a part of an electronic device.

17. The display assembly of claim 15, wherein antiglare material is at least substantially free of a polymer material.

* * * * *